United States Patent [19]
Tanaka

[11] Patent Number: 5,565,047
[45] Date of Patent: Oct. 15, 1996

[54] PNEUMATIC TIRE WITH SPECIFIED CARCASS LINE FOR REDUCED ROAD NOISE

[75] Inventor: Masatoshi Tanaka, Takarazuka, Japan

[73] Assignee: Sumitomo Rubber Industries, Ltd., Hyogo-ken, Japan

[21] Appl. No.: 292,011

[22] Filed: Aug. 18, 1994

[30] Foreign Application Priority Data

Aug. 25, 1993 [JP] Japan ..................................... 5-234119

[51] Int. Cl.$^6$ ................ B60C 3/00; B60C 9/02; B60C 11/01; B60C 13/00
[52] U.S. Cl. ............................ 152/454; 152/525; 152/548
[58] Field of Search ....................................... 152/454, 548, 152/525

[56] References Cited

U.S. PATENT DOCUMENTS

| | | | |
|---|---|---|---|
| 4,037,637 | 7/1977 | Arimura et al. | 152/454 |
| 4,282,918 | 8/1981 | Tomoda et al. | 152/454 X |
| 4,387,758 | 6/1983 | Matsuda et al. | 152/454 |
| 4,785,861 | 11/1988 | Fujiwara | 152/454 X |
| 4,955,416 | 9/1990 | Takeuchi et al. | 152/454 |
| 5,196,076 | 3/1993 | Ochiai | 152/454 |
| 5,353,856 | 10/1994 | Kishi et al. | 152/454 X |

FOREIGN PATENT DOCUMENTS

| | | |
|---|---|---|
| 0317487 | 5/1989 | European Pat. Off. . |
| 0533085 | 3/1993 | European Pat. Off. . |
| 2187559 | 1/1974 | France . |
| 2926159 | 1/1980 | Germany . |

*Primary Examiner*—Adrienne C. Johnstone
*Attorney, Agent, or Firm*—Birch, Stewart, Kolasch & Birch, LLP

[57] ABSTRACT

A pneumatic tire is provided with an improved carcass line which reduces the transmission of vibration during running to reduce the road noise. In a meridian section of tire when mounted on a standard rim but not inflated, the carcass line defined by the thickness center line of the carcass comprises a tread crown part, a pair of upper sidewall parts radially outward of the maximum carcass width position, and a pair of shoulder parts between the tread crown part and the upper sidewall parts. The tread crown part has a first single radius of curvature R1, the upper sidewall parts has a second single radius of curvature R2, and the shoulder parts has a third single radius of curvature R3. The third radius of curvature R3 is in the range of from 0.003 to 0.03 times the first radius of curvature R1, the third radius of curvature R3 is in the range of from 0.05 to 0.5 times the second radius of curvature R2. The axial position of the boundary between the tread crown part and each shoulder part is between the axial position of each edge of the belt and a position which is 20 mm axially inward thereof.

8 Claims, 6 Drawing Sheets

PRIOR ART

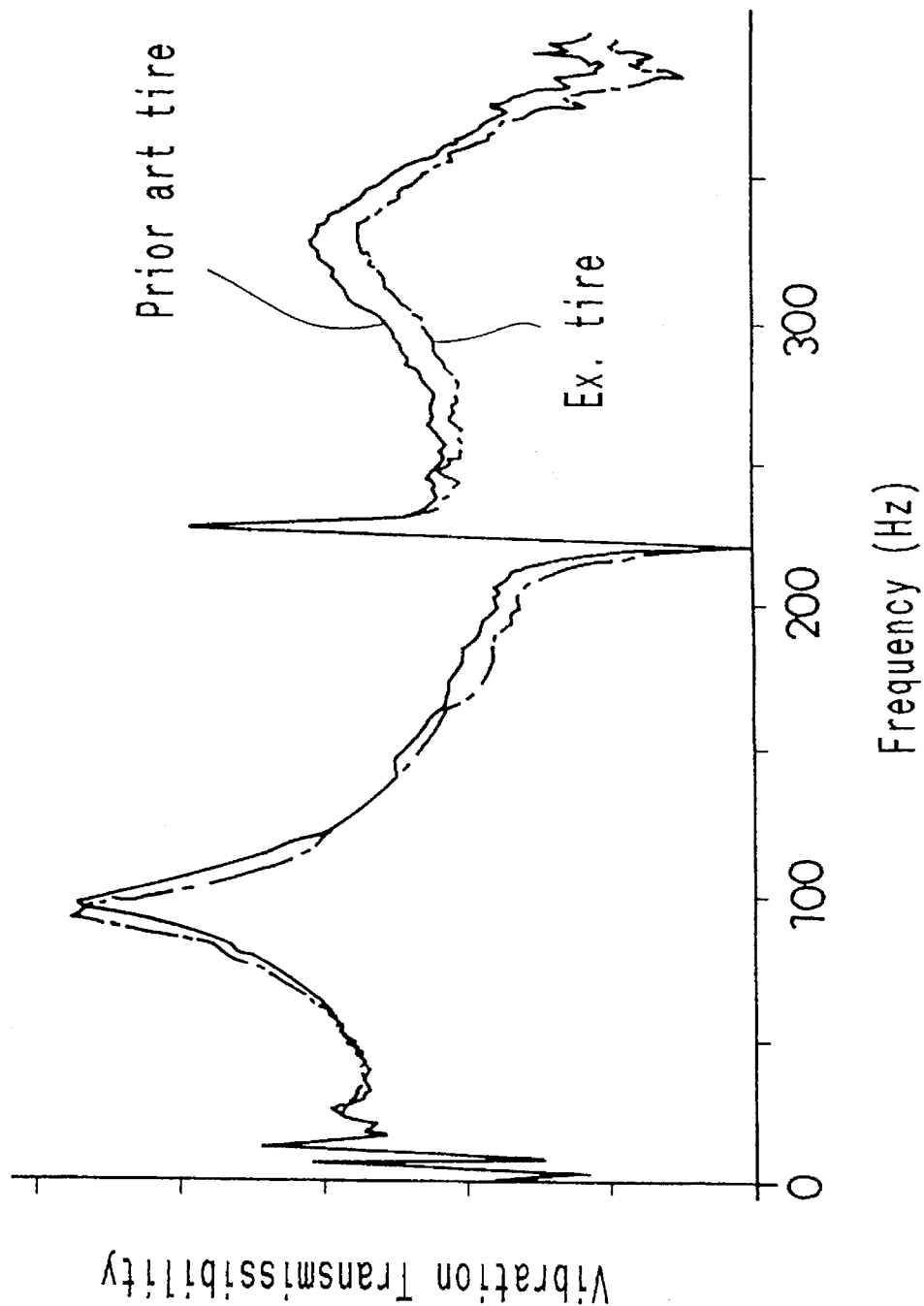

PNEUMATIC TIRE WITH SPECIFIED CARCASS LINE FOR REDUCED ROAD NOISE

BACKGROUND OF THE INVENTION

The present invention relates to a pneumatic tire having an improved carcass line which is capable of reducing the transmission of vibration during running and thereby reducing road noise.

Tires vibrate during running caused by roughness of the road surface, and the vibrations are transmitted from the tire tread portion to the vehicle body through the tire sidewall and bead portions and the wheel to produce the so called road noise which has a peak which lies around 200–250 Hz. In a radial tire provided with a stiff belt, e.g. a steel belt, the road noise is remarkably large. Therefore, in order to reduce the road noise, the tread rigidity has been decreased by decreasing the tread rubber hardness and/or belt cord modulus. Further, it has been proposed to provide the inside of the tire with a vibration damper layer made of a foam rubber.

However, when the tread rigidity is lowered, the cornering force is inevitably decreased, causing a deterioration in the steering performance. On the other hand, when a damper layer is disposed in the tire, the dynamic balance of the tire is disturbed, and the ride comfort deteriorates.

It is therefore an object of the present invention to provide a pneumatic tire in which, the road noise can be reduced without lowering the tread rigidity and without using an additional damper material.

SUMMARY OF THE INVENTION

According to one aspect of the present invention, a pneumatic tire comprises a tread portion, a pair of axially spaced bead portions, each with a bead core therein, a pair of sidewall portions, a carcass extending between the bead portions, and a belt disposed radially outside the carcass and inside the tread portion, in a meridian section of the tire when mounted on a standard rim but not inflated, the carcass line defined by the thickness center line of the carcass comprises a tread crown part which is beneath the belt, a pair of upper sidewall parts radially outward of the maximum carcass width position, and a pair of shoulder parts between the tread crown part and the upper sidewall parts, the tread crown part having a first single radius of curvature R1, the upper sidewall parts having a second single radius of curvature R2, and the shoulder parts having a third single radius of curvature R3, the third radius of curvature R3 being in the range of from 0.003 to 0.03 times the first radius of curvature R1, the third radius of curvature R3 being in the range of from 0.05 to 0.5 times the second radius of curvature R2, the axial position of the boundary between the tread crown part and each shoulder part being between the axial position of each edge of the belt and a position which is 20 mm axially inward thereof.

By setting the first, second and third radii R1, R2 and R3 as explained above, the carcass line has a squared profile, in rather than a round profile under a non-inflated state. As the inner pressure of the tire is increased to a normal pressure, the carcass line is changed such that the tread crown part and upper sidewall parts swell or move outwardly or the tire. However, as shown in FIG. 3, the shoulder parts between the crown part and sidewall parts moves inwardly of the tire, and the tension of the carcass cords in the inflated condition is partially decreased in the shoulder parts. As a result, the vibration transmissibility from the tread portion to bead portions especially in a frequency range of under 200–250 Hz is decreased, and the road noise can be effectively reduced.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings, wherein:

FIG. 6 is a graph showing the vibration transmissibility of a tire of the present invention as a function of frequency.

DETAILED DESCRIPTION OF THE INVENTION

Figure 1:
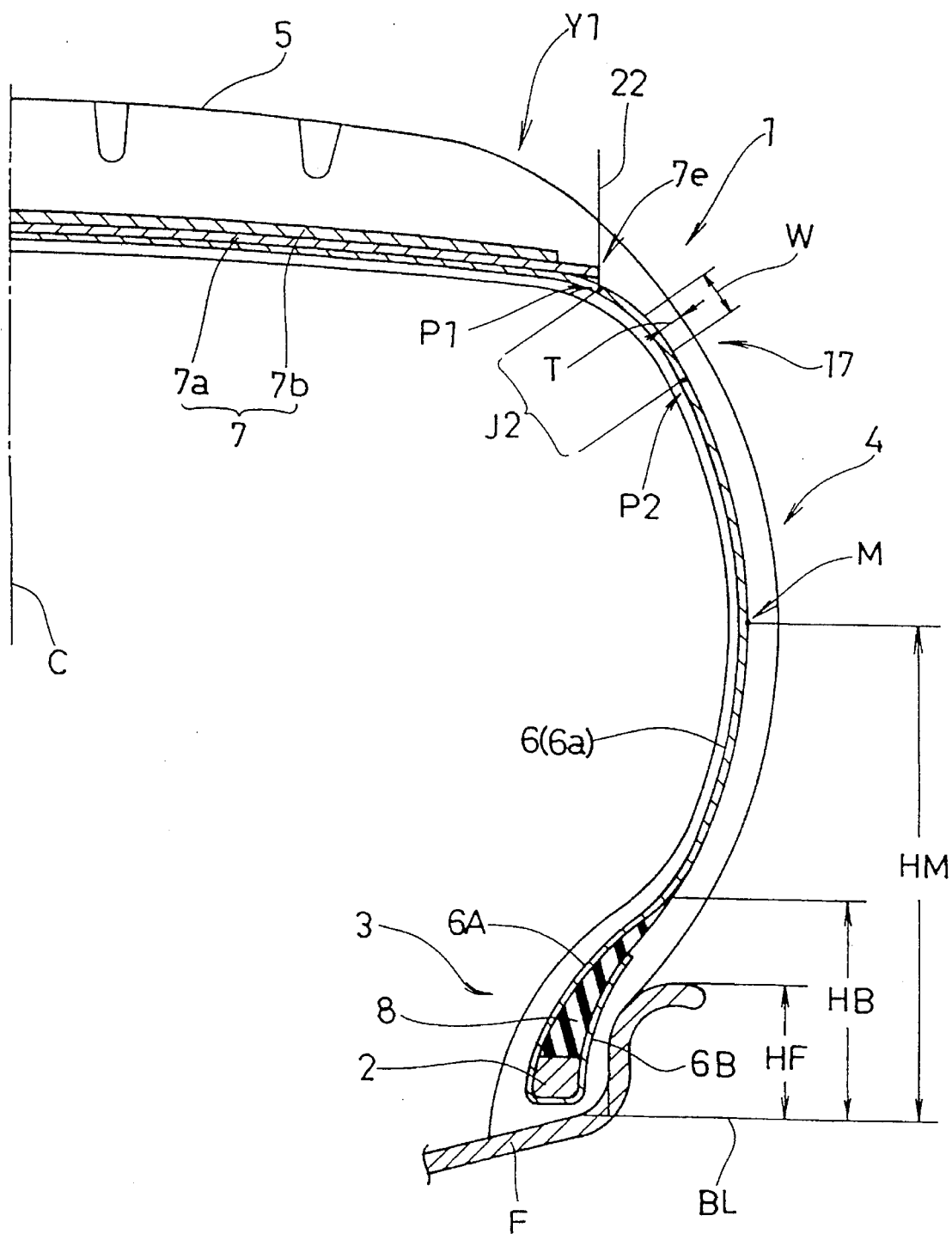
FIG. 1 is a cross sectional view of an embodiment of the present invention.

In FIG. 1, a pneumatic tire 1 comprises a pair of axially spaced bead portions 3 with a bead core 2 disposed therein, a sidewall portion 4 extending radially outwardly from each of the bead portions 3, a tread portion 5 extending between the radially outer ends of the sidewall portions 4, a carcass 6 extending between the bead portions 3 through the tread portion 5 and sidewall portions 4 and turned up around the bead cores 2 from the inside to outside of the tire, and a stiff belt 7 disposed radially outside the crown portion of the carcass 6 and inside the tread portion 5.

In this embodiment, the pneumatic tire 1 is a passenger radial tire having a aspect ratio (tire height/tire width) of not more than 0.70.

The tire mounted on a regular rim F but not inflated has a profile which is substantially same as that in the vulcanizing mold. The tire is mounted on the rim F by filling the tire with pressurized air as usual, and then the air is released to zero pressure.

The carcass 6 comprises at least one ply, in this example only one ply 6a, of cords arranged at an angle of 75 to 90 degrees with respect to the tire equator C. For the carcass cords, organic fiber cords, e.g. polyester, nylon and the like are preferably used. In this example, polyester fiber cords are used. As the carcass 6 is turned up, a toroidal main portion 6A extending from one bead core to the other bead core and a pair of turned up portions 6B are formed. The height of the turned up portions 6B is larger than the height HF of the Flange of the rim F.

Between the toroidal main portion 6A and each turned up portions 6B, a bead apex 8 made of hard rubber tapering radially outwardly From the bead cores 2 is disposed. The height HB of the radially outer end of the bead apex 8 from the bead base line BL is smaller than the height HM of the maximum width position M From the bead base line BL at which position the maximum width of the carcass 6 lies.

The radially outer end of the turned up portion 6B is terminated on the axially outer face of the bead apex 8 so that the carcass has a so called low turnup structure.

In this embodiment, the belt 7 consists of a radially inner ply 7a and a radially outer ply 7b, each extending over the substantially whole width of the tread portion 5. The inner ply 7a is slightly wider than the outer ply 7b, and therefore, the edges 7e of the belt 7 as a whole are those of the widest ply 7a. The belt plies 7a and 7b are made of parallel cords laid at angle of not more than 30 degrees, in this example about 20 degrees with respect to the tire equator so that the cords in each ply cross those in the other ply. For the belt cords, steel cords are used, but inextensible high modulus strong organic cords such as aromatic polyamide fiber cords and the like can be used. The radially innermost ply 7a directly contacts with the carcass except its edge portions and the edge portions are gradually spaced apart from the carcass towards the ends thereof.

Figure 2:
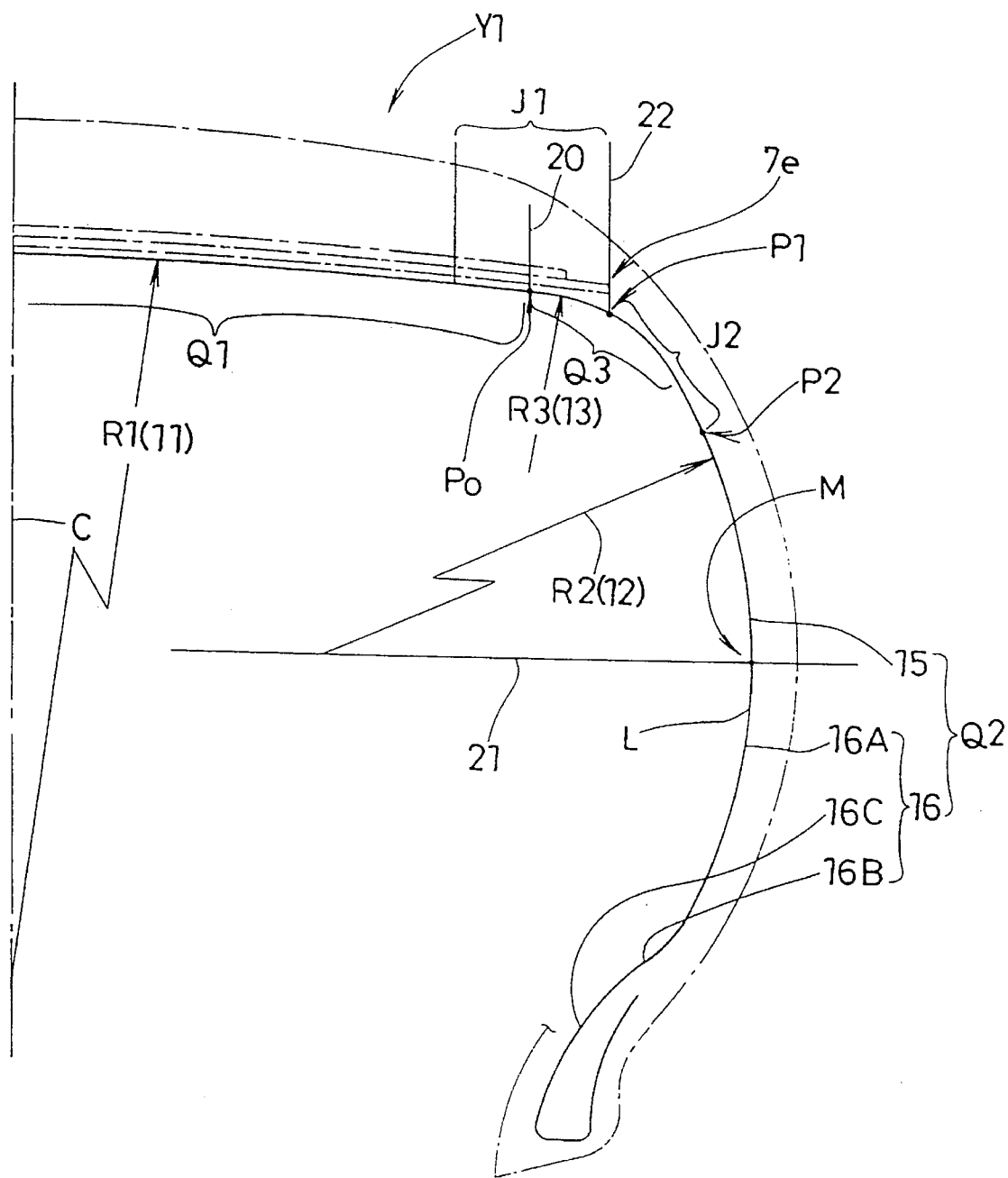
FIG. 2 is a diagram showing the carcass line thereof.
Figure 4:
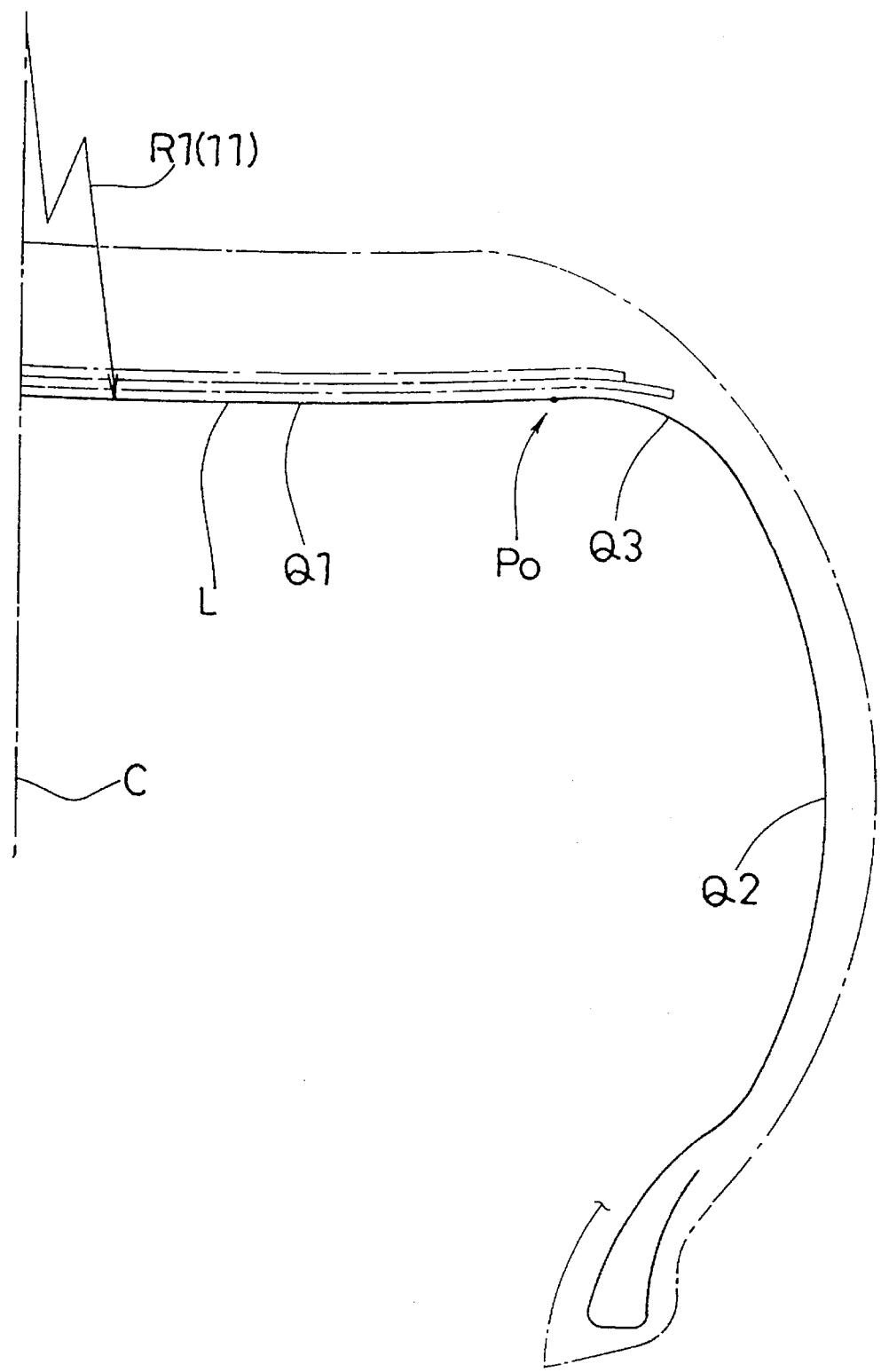
FIG. 4 is a schematic cross sectional view of another embodiment of the present invention.

In the present invention, the carcass line L under an inner pressure of 0 kgf/cm$^2$ is specifically defined. Here, the carcass line L is defined by the thickness center line of the carcass 6. The carcass line L comprises, as shown in FIG. 2, a crown part Q1 extending between a pair of shoulder points Po, a pair of upper sidewall parts 15 extending radially outwardly from the maximum width points M, and a pair of shoulder parts Q3 extending therebetween. The crown part Q1 is defined by a single radius arc 11 having the center on the tire equator C and a first radius of curvature R1. In this embodiment, the crown part Q1 is a convex curve. However, the crown part Q1 can be a concave curve as shown in FIG. 4. Also it may be flat. The shoulder points Po are on the carcass line, each axially positioned between each of the axially outer edges 7e of the belt 7 and a position spaced axially inwardly apart from the outer edge 7e by a distance of 20 mm. The axial position of the shoulder point Po roughly corresponds to the position at which the contact relationship between the belt 7 and the carcass 6 changes to a noncontact relationship. Each of the upper sidewall parts 15 is defined by a single radius arc 12 having a second radius of curvature R2. The center of this part 15 is located inside of the tire and, in this embodiment, on a straight axial line 21 drawn between the maximum width points M.

Each of the shoulder parts Q3 extends from one of the edges of the crown part Q1 or one point Po to the radially outer edge of each sidewall part Q2, and each part Q3 is defined by a single radius arc 13 having a third radius of curvature R3. The center of this part Q3 is located inside the tire. The shoulder part Q3 and crown part Q1 inscribe each other. The shoulder parts Q3 are directly and smoothly connected to the upper sidewall parts 15 at a point P2 without forming any angled corner so that the shoulder part Q3 and upper sidewall part 15 inscribe each other. However, between the shoulder part Q3 and the upper sidewall part 15, it may be possible to dispose another curved line such as an ellipse and the like.

The third radius of curvature R3 is in the range of from 0.003 to 0.03 times the first radius of curvature R1, and also the third radius R3 is in the range of from 0.05 to 0.5 times the second radius of curvature R2. More preferably, the third radius R3 is in the range of from 0.005 to 0.010 times the first radius R1 and in the range of from 0.06 to 0.20 times the second radius R2.

Figure 3:
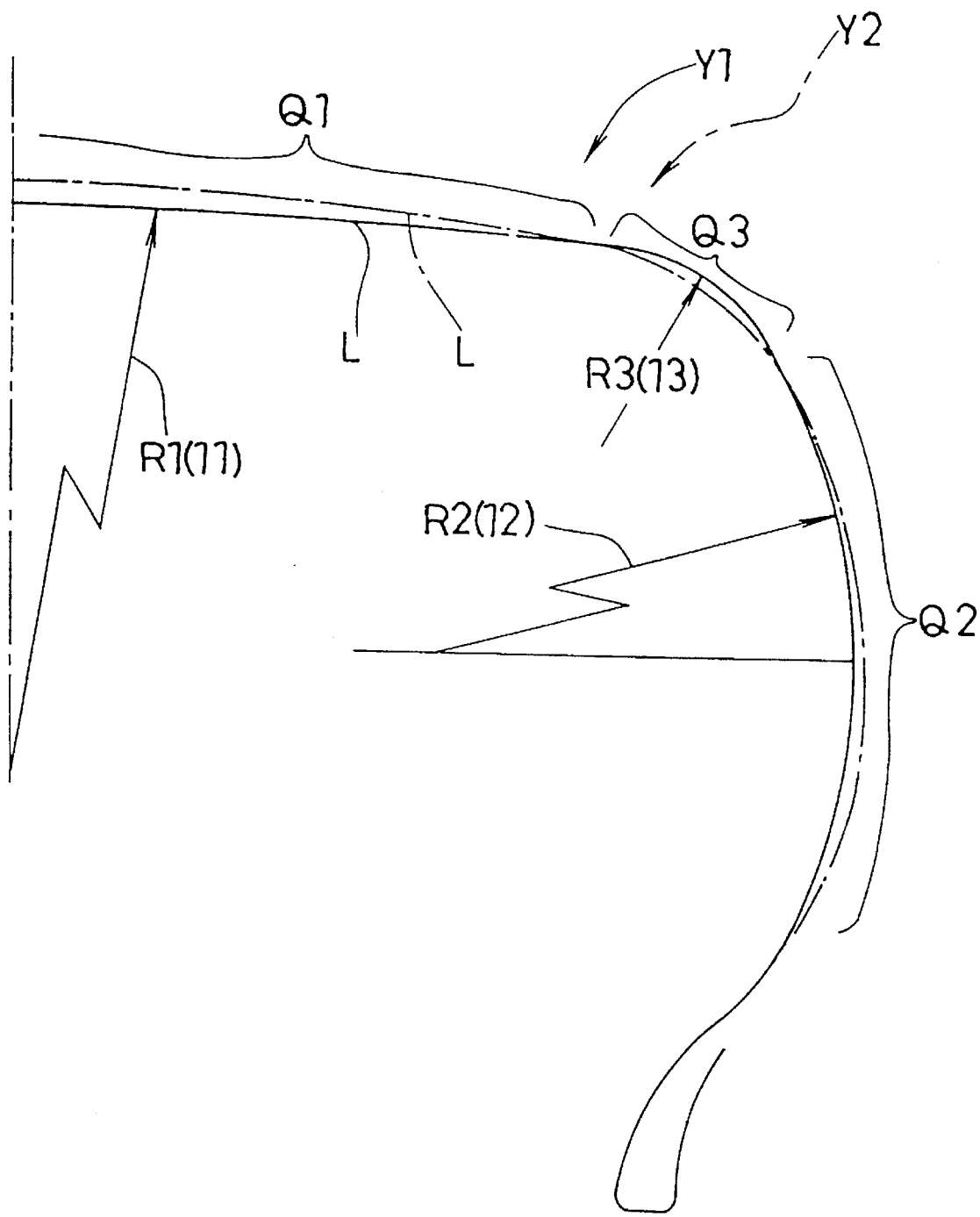
FIG. 3 is a diagram showing the change in the carcass line of the present invention from zero inner pressure to normal pressure.

Accordingly, as shown in FIG. 2, the carcass line L is bent sharply at the shoulder part Q3 so as to have a square configuration under a zero pressure condition rather than a conventional round configuration. As the inner pressure increases, the carcass line L changes its configuration such that the crown part Q1 and sidewall part Q2 inclusive of the upper sidewall part 15 swell towards the outside of the tire. However, on the contrary the shoulder parts Q3 is depressed contrary as shown in FIG. 3. In FIG. 3, the non-inflated state Y1 is shown as a solid line, and the exaggerated inflated state Y2 is shown in a chain line. As a result, the carcass cord tension is decreased in the shoulder part Q3 in comparison with the other parts, and the vibration transmissibility of the carcass 6 can be decreased.

Figure 5:
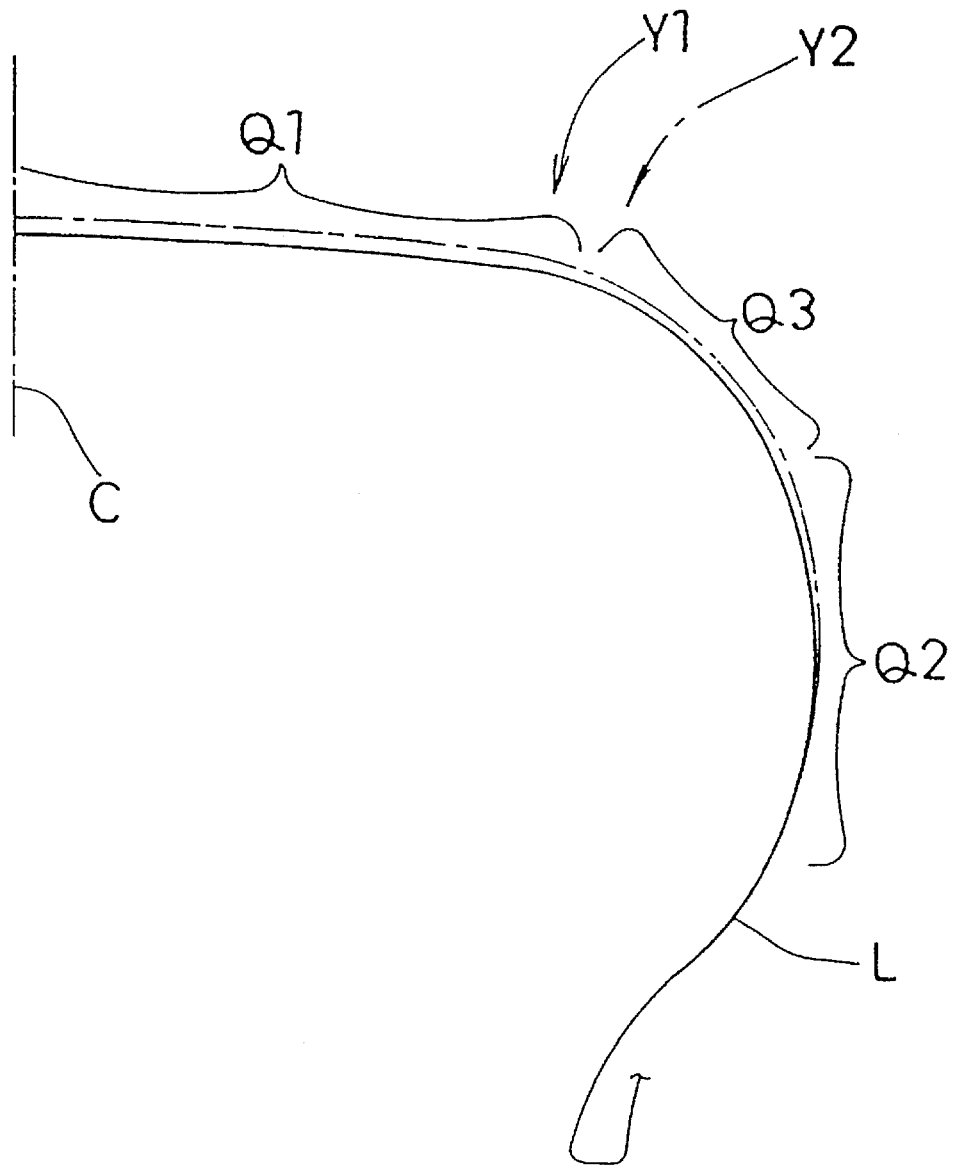
FIG. 5 is a diagram showing the change in the carcass line of a prior art tire from zero inner pressure to the normal pressure.

If the third radius of curvature R3 is more than 0.03 R1 or more than 0.5 R2, the shoulder parts Q3 will swell by tire inflation in the same manner as the remaining parts Q1 and Q2 as shown in FIG. 5, and the decreased tension part cannot be formed. On the contrary, if the third radius of curvature R3 is less than 0.003 R1 or less than 0.05 R2, it is difficult to manufacture such a tire.

In the lower sidewall part 16 which extends radially inwardly from the maximum width point M to the bead core 2, an outer part 16A extending radially inwardly from the maximum width point M is defined by an extension of the above-mentioned single radius arc 12 thereby having the same radius as the second radius of curvature R2. An inner part 16C extending along the axially inside of the bead apex 8 is curved such that the center of curvature thereof is located on the outside of the tire. A middle part 16B extending between the convex outer part 16A and the convex inner part 16C smoothly connects these parts to each other, whereby this middle part serves as an inflection point.

In case of a passenger tire whose nominal section width is from 95 to 315 mm, the first radius of curvature R1 is in the range of from 600 to 5000 mm. The third radius of curvature R3 is preferably not less than 18 mm, more preferably not less than 20 mm. If the nominal section width is under 200 mm, the R1 is preferably 600 to 3000 mm. If the nominal section width is 200 mm or more, the R1 is preferably 1000 to 5000 mm. Here, the nominal section width is of the standardized metric tire size designation such as JIS-D4204 in Japan.

FIG. 6 shows the difference in vibration transmissibility between a conventional tire and an example tire of the present invention in which the cord tension is decreased in the shoulder parts Q3 as explained above. The example tire and the conventional tire had the same construction except the carcass line. The tire size was 205/65VR15, and the above-mentioned radii R1, R2 and R3 were as follows.

| Tire | Ex. | Con. |
| --- | --- | --- |
| R1 (mm) | 1500 | 1000 |
| R2 (mm) | 65 | 65 |
| R3 (mm) | 24 | 35 |

In the test, the tire inflated to a normal pressure was mounted on a test car, and the tread portion was hit on the tire equator with a hammer by 10 kg force. And the generated vibration was measured at the wheel axis, and a frequency analysis was made. The results are shown in FIG. 6. As shown in this figure, the vibration transmissibility of the tire of the invention was decreased to reduce the road noise. In particular, the transmissibility was effectively decreased around 250 Hz.

Through the test, it was confirmed that the road noise can be reduced by decreasing the carcass cord tension at the shoulder parts. However, it was also discovered that the vibration transmissibility can be further decreased by decreasing the rubber thickness in the tire shoulder part Q3.

The rubber thickness is therefore, preferably decreased in the tire shoulder portions. This reduced thickness part 17 is, as shown in FIGS. 1 to 2, formed in a region J2 which is between a point P1 on the carcass line L at the same axial position as that of the axially outer edge 7e of the belt 7, and a point P2 on the carcass line L extending 20 mm along the carcass line L from the point P1 towards the sidewall portion 4. In the reduced thickness part 17, the rubber thickness T is set in the range of from 1.5 mm to 3.5 mm, and the width W of this part 17 is in the range of from 3 mm to 20 mm. Here, the rubber thickness T is measured from the outer surface of the tire to the carcass and normal to the carcass line. The width W is measured along the surface of the carcass. By providing this thinner part 17, the bending rigidity is decreased in the shoulder part, and the vibration transmissibility is further reduced. In this embodiment, the reduced thickness part 17 is formed by gradually changing the rubber thickness from radially outside and inside of this part 17. However, it may be possible to change the thickness steppedly.

Changing the radii R1, R2 and R3 and the thickness T, test tires of size 205/65VR15 were made and tested for road noise. The test results are given in Table 1. In the tests, the road noise was measured at given frequencies of 160 Hz and 250 Hz and over all frequency ranges. The tires were mounted on all the wheels of a front wheel driven car and then run on a hot-rolled asphalt road at a speed of 60 km/h to measure the noise with a microphone at the driver's right ear position.

Through the tests, it was confirmed that the example tires were remarkably reduced in the 250 Hz noise level in comparison with the reference tire.

In comparison with the Ex.1 tire, the Ex.2 tire was improved in over all noise by increasing the second radius R2.

In comparison with the Ex.2 tire, the Ex.3 tire was improved in over all noise by increasing the second radius R1.

In comparison with the Ex.3 tire, the Ex.4 tire was improved in over all noise and 250 Hz noise by increasing the second radius R2.

In comparison with the Ex.4 tire, the Ex.5 tire was improved in over all noise by decreasing the third radius R3.

In comparison with the Ex.5 tire, the Ex.6 tire was increased in rubber thickness T. As a result, the noise level was increased, but better than the reference tire.

In the Ex.7 tire, the third radius R3 is further decreased, but an effective noise reduction could not be obtained.

The Ex.8 tire was formed such that the curve of the tread crown part was concave in contrast with the former Ex. tires. By the concave carcass line, the cord tension and noise level were further decreased when compared with the Ex.4 tire which was different only in the type of the crown curve.

As explained above, in the pneumatic tires of the present invention, the vibration transmissibility of the shoulder part is decreased, and the road noise, especially over 200 Hz range can be effectively reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising a tread portion, a pair of axially spaced bead portions, each with a bead core therein, a pair of sidewall portions, a carcass extending between the bead portions, a belt disposed radially outside the carcass and inside the tread portion, in a meridian section of the tire when mounted on a standard rim but not inflated, the carcass line defined by the thickness center line of the carcass comprising a tread crown part which is beneath the belt,

TABLE 1

| Tire | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| R1 *1(mm) | 1000 | 1500 | 1500 | 3000 | 3000 | 3000 | 3000 | 5000 | −3000 |
| R2 (mm) | 65 | 65 | 120 | 120 | 230 | 230 | 230 | 300 | 230 |
| R3 (mm) | 35 | 24 | 24 | 24 | 24 | 20 | 20 | 18 | 24 |
| R3/R1 | 0.035 | 0.016 | 0.016 | 0.008 | 0.008 | 0.007 | 0.007 | 0.0036 | 0.008 |
| R3/R2 | 0.538 | 0.369 | 0.200 | 0.200 | 0.104 | 0.087 | 0.087 | 0.060 | 0.104 |
| T (mm) | 4.5 | 3.0 | 3.0 | 3.0 | 3.0 | 3.0 | 4.5 | 2.8 | 3.0 |
| Road noise dB(A) | | | | | | | | | |
| Overall | 70.8 | 69.7 | 69.4 | 69.0 | 68.8 | 68.4 | 68.7 | 68.3 | 68.6 |
| 160 Hz | 64.1 | 63.6 | 63.5 | 63.2 | 63.1 | 62.8 | 63.0 | 62.7 | 62.8 |
| 250 Hz | 64.7 | 63.6 | 63.2 | 62.9 | 62.5 | 62.0 | 62.3 | 61.9 | 62.3 |

*1 a minus value indicates that the center of the arc is positioned outside of the tire a pair of upper sidewall parts radially outward of the maximum carcass width position, and a pair of shoulder parts between the tread crown part and the upper sidewall parts, the tread crown part having a first single radius of curvature R1, the upper sidewall parts having a second single radius of curvature R2, and the shoulder parts having a third single radius of curvature R3, the third radius of curvature R3 being in the range of from 0.003 to 0.03 times the first radius of curvature R1, the third radius of curvature R3 being in the range of from 0.05 to 0.5 times the second radius of curvature R2, the axial position of the boundary between the tread crown part and each shoulder part being between the axial position of each edge of the belt and a position which is 20 mm axially inward thereof.

2. The pneumatic tire according to claim 1, wherein the tread crown part is a convex arc.

3. The pneumatic tire according to claim 1, wherein the tread crown part is a concave arc.

4. The pneumatic tire according to claim 1, wherein a reduced rubber thickness part is provided in each shoulder region, which region is defined between a first point (P1) on the carcass line at the same axial position as each of the belt edges (7e) and a second point (P2) on the carcass line spaced apart radially inwardly from the first point by 20 mm along the carcass line, the reduced rubber thickness part having a rubber thickness in the range of from 1.5 mm to 3.5 mm and a width in the range of from 3 mm to 20 mm, said rubber thickness being measured normally to the carcass line from the tire outer surface to the carcass, and said width being measured along the surface of the carcass.

5. The pneumatic tire according to claim 1, wherein the section width of the tire is in the range of from 95 to under 200 mm, and the first radius of curvature R1 is in the range of from 600 to 3000 mm.

6. The pneumatic tire according to claim 5, wherein the third radius of curvature R3 is not less than 18 mm.

7. The pneumatic tire according to claim 1, wherein the section width of the tire is in the range of from 200 to 315 mm, and the first radius of curvature is in the range of from 1000 to 5000 mm.

8. The pneumatic tire according to claim 7, wherein the third radius of curvature R3 is not less than 18 mm.

* * * * *